(12) United States Patent
Bos et al.

(10) Patent No.: US 6,626,574 B2
(45) Date of Patent: Sep. 30, 2003

(54) SQUEEZE FILM DAMPING TYPE BEARING

(75) Inventors: Mathieu Bos, Zonhoven (BE);
Sébastien Ryhon, Sprimont (BE)

(73) Assignee: Techspace Aero S.A. (BE)

( * ) Notice: Subject to any disclaimer, the term of this patent is extended or adjusted under 35 U.S.C. 154(b) by 0 days.

(21) Appl. No.: 09/896,758

(22) Filed: Jun. 29, 2001

(65) Prior Publication Data

US 2002/0067871 A1 Jun. 6, 2002

(30) Foreign Application Priority Data

Jun. 30, 2000 (EP) .............................................. 00870149

(51) Int. Cl.⁷ .............................................. F16C 27/00
(52) U.S. Cl. .......................................... 384/99; 384/535
(58) Field of Search .................................... 384/99, 535

(56) References Cited

U.S. PATENT DOCUMENTS

| | | |
|---|---|---|
| 3,652,139 A | 3/1972 | Memery |
| 3,756,672 A | 9/1973 | Hibner et al. |
| 4,175,803 A | 11/1979 | Roberts ........................ 308/9 |
| 4,337,983 A | 7/1982 | Hibner |
| 4,400,098 A | 8/1983 | Lacey et al. |
| 4,440,456 A | 4/1984 | Klusman |
| 4,752,178 A | 6/1988 | Greenhill ..................... 411/521 |
| 5,058,452 A | 10/1991 | El-Shafei |
| 5,251,985 A | 10/1993 | Monzel ........................ 384/99 |
| 5,639,074 A | 6/1997 | Greenhill et al. ........... 267/162 |

FOREIGN PATENT DOCUMENTS

| FR | 2517772 | 6/1983 |
|---|---|---|
| JP | 09 112549 | 5/1997 |

OTHER PUBLICATIONS

"Wave Spring Washers to BE 4463". Retrieved Jan. 13, 2003, from http://wwwspringmasters.com/sp/wave–spring–washeres–4.html.
"Compact round wire wave spring fits in tight space". Retrieved Jan. 13, 2003, from engineeringtalk.com, http://wwwengineeringtalk.com/news/tfc/tfc103.html.
"Wave Spring Washers". Retrieved Jan. 13, 2003 from HK Metalcraft Manufacturing Corporation, http://hkmetalcraft.com/product/wsw/wsw/htm.
"Wave Springs"; Retrieved Jan. 13, 2003 from Smalley Steel Ring Company, http://wwwsmalley.com/SpringApps.asp.
Engineering & Parts Catalog #RR–2002. Lake Zurich, IL: Smalley Steel Ring Company, 57 pages Dec. 2002.
Engineering & Parts Catalog #WS–2002. Lake Zurich, IL: Smalley Steel Ring Company, 40 pages Dec. 2002.

*Primary Examiner*—Thomas R. Hannon
(74) *Attorney, Agent, or Firm*—Knobbe, Martens, Olson & Bear, LLP

(57) ABSTRACT

The present invention is related to a bearing for maintaining an inner mobile structural component with a revolution symmetry, rotating inside an outer structural component, which is itself fixed or mobile, said bearing comprising a set of balls or rollers and at least an outer race which provides the mechanical contact between said balls or rollers and said outer structural component, said bearing also comprising a pressurized-oil damper known as a "squeeze film" damper, arranged at the annular contact surface between said outer race and the outer structural component, characterized in that each side surface of the outer race is in contact with a side seal having an annular form, said seals being securely fastened to the outer race by means of a series of anti-rotation fixing members.

8 Claims, 3 Drawing Sheets

SQUEEZE FILM DAMPING TYPE BEARING

CROSS-REFERENCE TO RELATED APPLICATION

This application claims priority to European Application Serial Number 00 870 149.2, filed Jun. 30, 2000, the disclosure of which is incorporated herein by reference in its entirety.

BACKGROUND

1. Field of the Invention

The present invention relates to a damping device of "squeeze film" type which acts as a pressurized-oil damper, integrated in a rolling bearing, which is intended in particular to be used in civil aeronautics.

Specifically, the invention relates to the rolling bearing using the damping device.

2. Description of Related Art

A rolling bearing such as, for example, in an aircraft engine, serves as a link between one or more inner mobile members, preferably having a revolution symmetry and rotating about an axis, and an outer structural component. The outer structural component may itself be either fixed or mobile. This structure also has a revolution symmetry relative to the rotational axis of the mobile member(s). It may be, for example, in the shape of a cone.

The rolling bearing consists substantially of balls or rollers which move on tracks that are securely fastened or made with races, preferably an inner race and an outer race.

When working, forces are transmitted from the mobile member to the outer structural component, in particular via the outer rolling race, which is directly in contact with the outer structural component.

In order to damp the effect of these forces, it is known to confine a film of oil between the outer rolling race, which works by friction, and the outer structural component. This film of oil is commonly known as a "squeeze film".

The oil present at the race/outer structural component contact surface is oil under pressure, which acts as a damper.

Most of the known "squeeze films" annulus are made leakproof by means of seals in the form of segments of "piston" type. These seals are placed in two annular grooves machined in the race at its surface of contact with the outer structural component. The film of oil is consequently more particularly confined in the space delimited by these two annular grooves.

When the bearing is located at the extremity of the rotation shaft and submitted to an axial force, it is referred to as a thrust bearing. In this particular case, an additional problem comes from the fact that this type of bearing has to be provided with a centring system which has to take over this axial force. This is particularly important at full working speed.

Therefore, it has been proposed, according to the state of the art, to use a metallic cage consisting in bolted rods as joining members between the outer race, at one of their extremities, and the external structure, which is usually fixed, at the other extremity of the bolted rods.

The main problem is therefore double: it lies in the leaktightness of such a classical device and in the centring of said device relatively to the axial force.

Document U.S. Pat. No. 4,175,803, in particular, describes the "squeeze film" technique constituting a pressurized-oil damper, used particularly in engines of gas turbine type.

In these engines, two rolling bearings are used to maintain in a fixed structure, at its ends, the shaft bearing the vanes of the compressor and of the low-pressure turbine.

Similarly, two other rolling bearings are used to maintain in rotation, about the abovementioned shaft, the shaft bearing the vanes of the compressor and the vanes of the high-pressure turbine. One of the bearings bears on the abovementioned shaft, and the other bears on the fixed structure.

These four rolling bearings are examples of the field of application of the present invention.

The bearings are subjected to vibrations brought about by certain imbalances. During these vibrations, the hydraulic damping film (known as the "squeeze film") is "crushed" at a point of the annular space which exists between the outer race and the outer structural component surrounding this race.

The vibrations drive this "crush point" in an orbital (precessional) motion along the annular space.

The presence of oil maintained under pressure in the annular space, by means of the orbital motion, has the effect of creating a damping of the vibration.

In order to produce a sufficient and stable damping, it is desirable to maintain the "squeeze film" annulus by means of a sealing device.

Most of the "squeeze films" proposed comprise seals of the same type as the piston segments of motor vehicle engines and they act at least partially by a radial pressure, such as, for example, in document FR-A-2,517,772.

This type of seal has various drawbacks. Dynamic seals of piston-segment type must be machined with great precision. They are thus expensive. Furthermore, they are intricate to mount. Finally, they have an uncalibrated oil leakage and thus their damping is not always fully controlled.

Furthermore, this arrangement requires a certain space for installing the oil damper, especially for installing the centring rods about the motor axis. Therefore, this arrangement remains inappropriate for small turning devices. In addition, the assembling of this type of structure is relatively complex.

Document U.S. Pat. No. 3,756,672 discloses a pressurized oil damper, wherein the race is in contact with two side seals. However, these seals are not directly attached to said race. A rotational movement of said race relative to the bearing is thus made possible.

Documents U.S. Pat. No. 5,251,985, U.S. Pat. No. 4,337, 983, U.S. Pat. No. 3,652,139 and U.S. Pat. No. 5,058,452 describe various embodiments, wherein seals are directly in contact with the outer race by clamping. Again, in these different cases, the seals may rotate relatively to said race.

The fact that seals may still rotate relatively to said race will further reduce the leaktightness of the device.

SUMMARY OF THE INVENTION

The present invention aims to provide a solution that ensures a good leaktightness of the oil film constituting the "squeeze film" damper of a bearing.

The present invention aims to provide a solution which prevents any free rotation of the seals, especially at the base, but which still allows said seals to achieve a precessional motion relative to it.

The present invention further aims to ensure, in the particular case of a thrust bearing, the axial retention of the outer race relative to the outer structural component.

The present invention aims also to propose an alternative solution, wherein no space for installing centring rods is required, and for which the assembling of the various pieces is easy to perform.

Other aims and advantages will come to light through the reading of the following description.

Main Characteristic Elements of the Invention

The present invention is related to a bearing for maintaining an inner mobile structural component having a revolution symmetry, rotating inside an outer structural component, which is itself fixed or mobile, said bearing comprising a set of balls or rollers and at least an outer rolling race which provides the mechanical contact between said balls or rollers and said outer structural component, said bearing also comprising a pressurized-oil damper known as a "squeeze film" damper, arranged at the annular contact surface between said outer race and the outer structural component, characterized in that each side surface of the outer race is in contact with a side seal having an annular form, said seals being securely fastened to the outer race by means of a series of anti-rotation fixing members.

The side seals may be made at least partially of carbon.

Preferably, the side faces of each seal are coated at least partially with a coating comprising carbon.

Advantageously, the side seals are submitted to a precompression stress.

According to a first preferred embodiment, said precompression stress is achieved by gripping said outer race by means of Smalley springs.

According to a second preferred embodiment, said precompression stress is achieved by gripping said outer race by means of Belleville washers.

The present invention is also related to the use of the bearing disclosed hereabove as a thrust bearing arranged at the end of a rotating shaft.

SHORT DESCRIPTION OF THE DRAWINGS

DETAILED DESCRIPTION OF THE INVENTION

Figure 1:
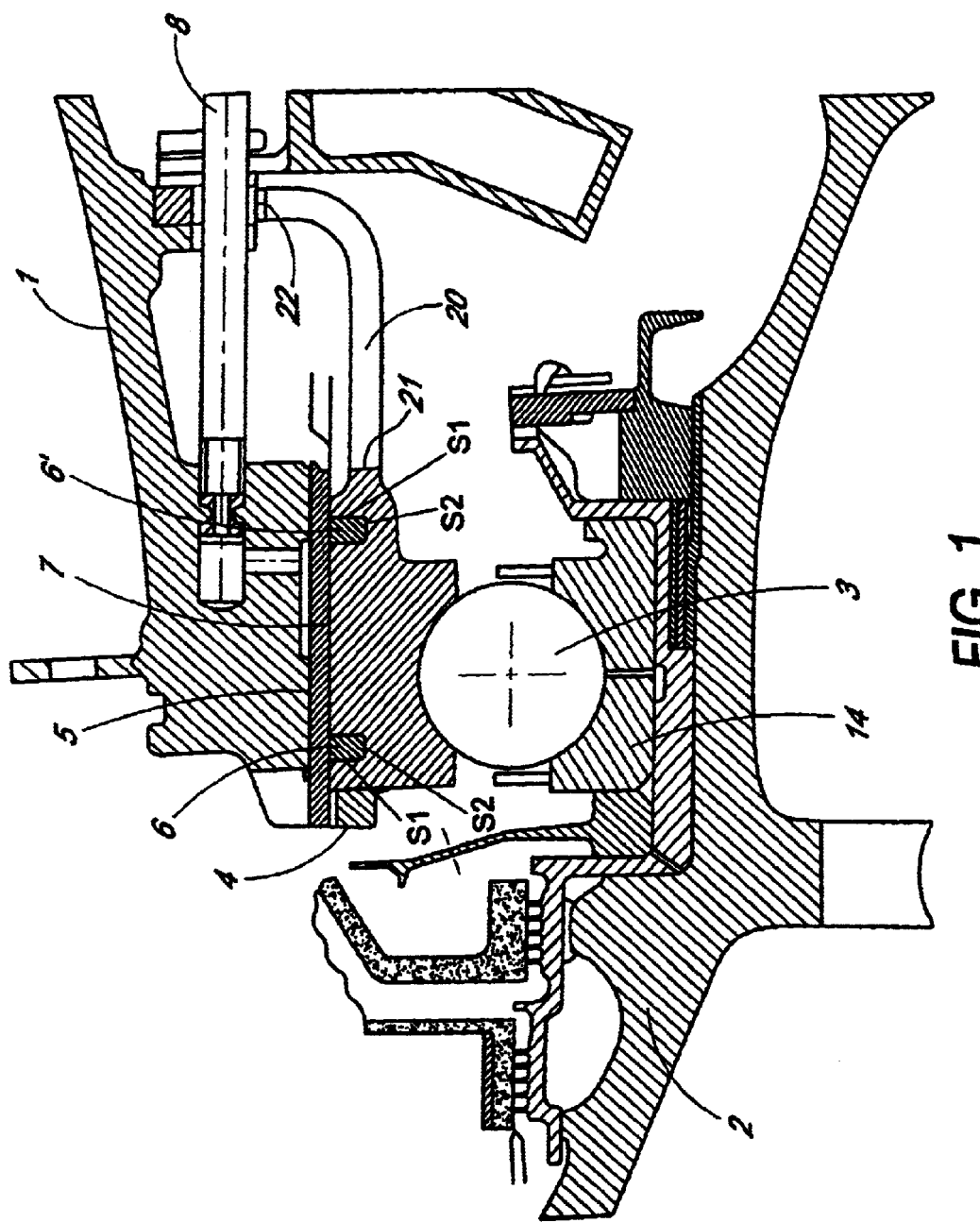
FIG. 1 represents a cross-section view, along a plane passing through the revolution axis, of a rolling bearing provided with a "squeeze film" damper according to the prior art.

FIG. 1 gives an example of a rolling bearing using a "squeeze film" according to the prior art, in the particular case of an aeronautic engine. The bearing ensures the connection between a fixed conical structure 1 arranged around a rotating mobile member 2, for example an engine shaft in this case, by means of one or more ball bearings 3. The bearing has a revolution symmetry about the axis of the engine shaft. The rolling bearing thus consists of a set of balls 3 arranged in a circle between the two outer 4 and inner 14 races. The balls 3 are placed in contact with the fixed structure 1 via the outer rolling race 4, the contact surface 5 between the outer rolling race 4 and the structure 1 being annular. Two grooves 6 and 6' are machined on this race 4 at the ends of the annular contact surface 5. A circular seal with substantially "squeeze film" is injected into this contact surface 5, between the two grooves 6 and 6' in an orifice 7 via a channel 8. The oil pressure which is exerted on the seal ensures the sealing by increasing the contact surface between the seal and two perpendicular surfaces S1 and S2 of the grooves, the pressure forces being both radial and axial.

The seals according to the prior art must be made to measure for each particular application. They require very precise mechanical adjustment and mounting.

In addition, in order to ensure the axial retention of said outer rolling race 4 and to ensure its centering, provision has been made for bolted rods 20 which serve as a connection between the said outer race 4 at one of their ends 21, while the other end 22 is bolted to the outer fixed part 1.

Description of One Preferred Embodiment of the Invention

The present invention aims to solve the problem of the satisfactory sealing of the oil film of the damper or "squeeze film" and the axial retention in the case of a thrust bearing.

This is solved, surprisingly, by proposing to arrange two sides seals 30 and 32 in an annular form along the two sides surfaces of the outer rolling race 4. These are therefore substantially two circular plates between which said outer rolling race 4 is gripped.

According to one preferred embodiment, these seals are made of carbon, since carbon has advantageous self-lubricating properties.

According to another embodiment, these seals may be made of an elastomeric material, optionally combined with a part made of carbon.

The gripping is achieved with the aid of a series of anti-rotation fixing members which pass through the said side seals 30 and 32 and securely fasten them to the two circular side surfaces of the outer rolling race 4. Although rotation is prevented by the presence of such anti-rotation members, they are, however, configured so as to allow a small precessional motion.

Figure 2:
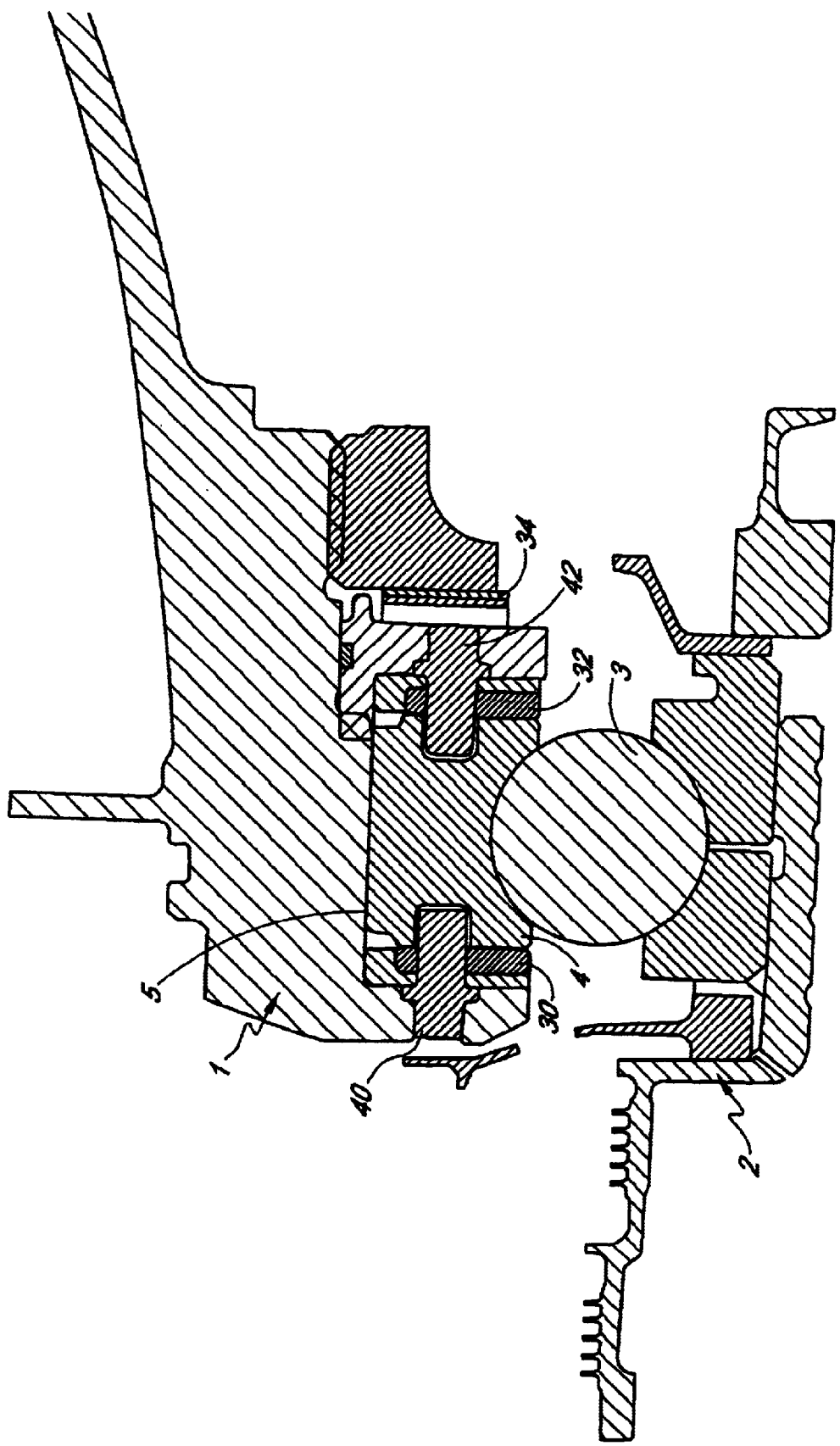
FIG. 2 represents a cross-section view, along a plane passing through the revolution axis, of a rolling bearing provided with a "squeeze film" damper according to one preferred embodiment of the present invention.

According to a first embodiment, it may be two series of independent members 40, 42, each series being adapted so as to securely fasten a side seal onto one of the two side faces of the outer race 4, as represented in FIG. 2.

Figure 3:
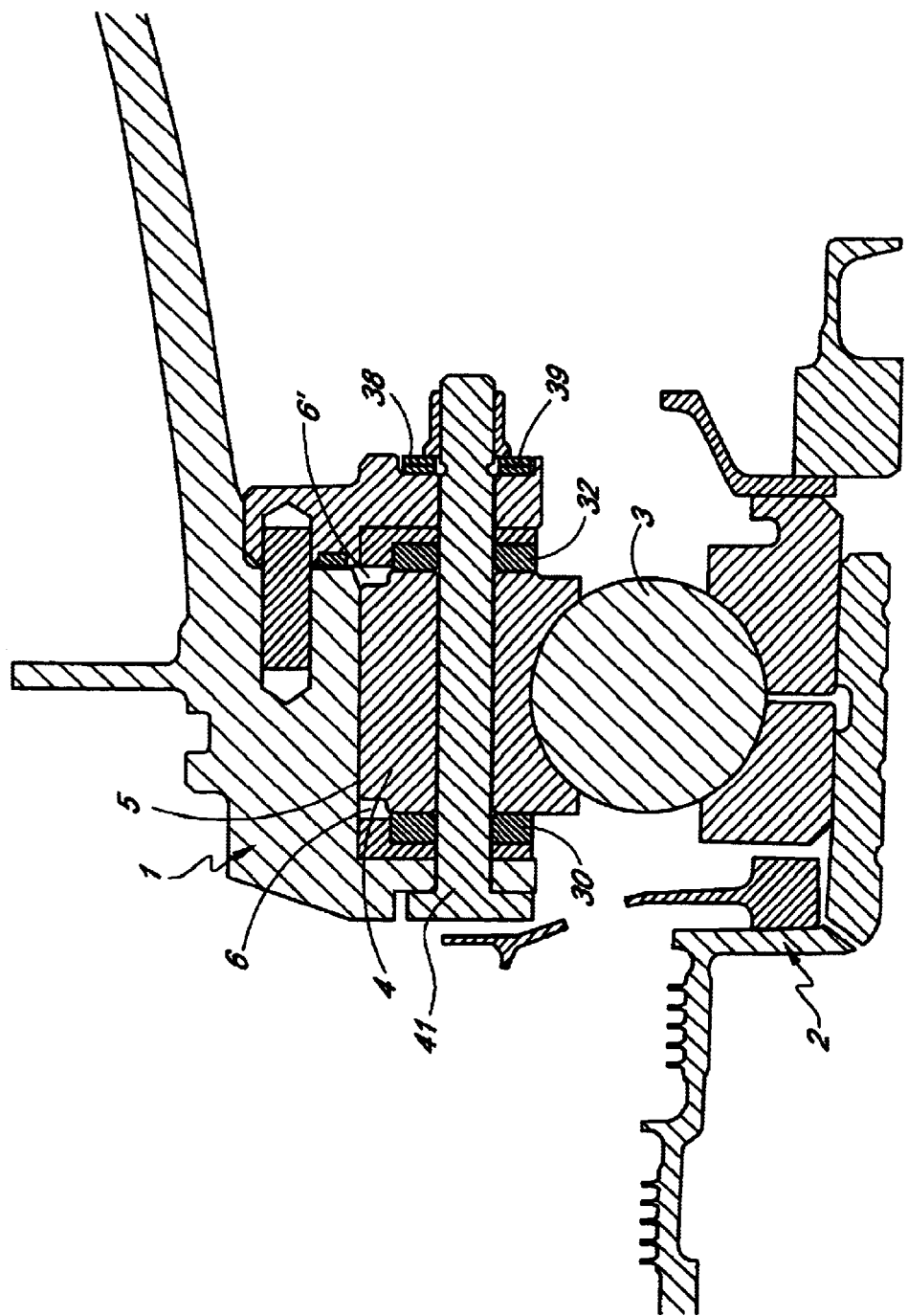
FIG. 3 represents a cross-section view, along a plane passing through the revolution axis, of a rolling bearing provided with a "squeeze film" damper according to one variant of this preferred embodiment of the present invention.

According to another embodiment, it is only one series of fixing devices 41 which pass through said outer race and which grip this race between the two side seals, as represented in FIG. 3.

According to one advantageous characteristic of the present invention, the said side seals may be subjected to a precompression stress by means of said fixing members. With this aim, it may be envisaged to affix either wave springs or wave washers 34, such as those made by Smalley® Steel Ring Company of Lake Zurich, Ill., as represented in FIG. 2, or Belleville washers 38 and 39, which are conical circular plates as represented in FIG. 3. In this case, by modifying the gripping, the stiffness of said springs or of said Belleville washers may be controlled, and hence also the precompression stress, to which the side seals 30 and 32 are subjected.

This makes it possible in a particularly advantageous manner to control the activating force, the activating force being defined as the force at and above which the relative precessional motion of the outer race relative to the fixed structure will commence. In the present case, it is thus the force required to overcome the frictional forces of said side seals 30 and 32 relative to the outer race 4.

The relative precessional motion of said outer race 4 relative to the fixed structure 1 is ensured at the contact surface 5 which remains lubricated.

In addition, the presence of the side seals allows a small oil leakage to be maintained along the side surface.

The present invention advantageously makes it possible to dispense with the use of a cage or bolted rods, and thus to reduce the cost and bulk of such bearings.

In addition, the present invention is easy to assemble while at the same time ensuring good sealing properties of the "squeeze film" and also good reproducibility.

The assembly is advantageously performed without tools, by simply placing the rolling bearing in the structure designed to receive it.

The assembly is carried out as follows:

- the ball bearing 3, provided with its outer race 4, is fitted in the structural component 1,
- the side seals in the annular form 30, 32 are then placed along the two side surfaces of the outer race 4, each side seal partially coming to bear in the corresponding groove 6, 6' formed by placing the race 4 in contact with the structure 1;
- each side seal 30, 32 is fixed using the anti-rotation fixing members 41 (FIG. 3) or 40 and 42 (FIG. 2), the member 40 fixing the side seal 30 and the member 42 fixing the side seal 32;
- the gripping means intended to exert a precompression stress on the side seals 30 and 32, that is to say preferably either a spring of Smalley type 34 (FIG. 2) or Belleville washers 38 and 39 (FIG. 3), are then placed in position.

What is claimed is:

1. A bearing for maintaining an inner mobile structural component with revolution symmetry rotating inside an outer structural component, which is itself fixed or mobile, said bearing comprising:

a set of balls or rollers;

an outer race which provides a mechanical contact between said set of balls and an outer structural component along an annular contact surface;

a pressurized-oil damper arranged at said annular contact surface between said outer race and said outer structural component; and at least two side seals having an annular form and being securely fastened to side surfaces of said outer race by means of a series of anti-rotation fixing members.

2. The bearing according to claim 1, wherein said at least two side seals are at least partially made of carbon.

3. The bearing according to claim 1, wherein side faces of each side seal are coated with a coating of carbon.

4. The bearing according to claim 1, wherein the at least two side seals are subjected to a precompression stress.

5. The bearing according to claim 4, wherein the precompression stress is made by gripping said outer race with wave springs or wave washers.

6. The bearing according to claim 4, wherein the precompression stress is made by gripping said outer race with Belleville washers.

7. The bearing according to claim 1, wherein said bearing is configured as a thrust bearing for use at the end of a rotating shaft.

8. The bearing according to claim 1, wherein said pressurized-oil damper is a squeeze film damper.

* * * * *